(12) United States Patent
Nakai

(10) Patent No.: US 12,669,764 B2
(45) Date of Patent: Jun. 30, 2026

(54) IMAGE FORMING APPARATUS THAT CAN PERFORM LIGHT AMOUNT CALIBRATION TO ADJUST THE DENSITY OF A HALF TONE IMAGE

(71) Applicant: KYOCERA Document Solutions Inc., Osaka (JP)

(72) Inventor: Jun Nakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/008,061

(22) Filed: Jan. 2, 2025

(65) Prior Publication Data

US 2025/0224689 A1 Jul. 10, 2025

(30) Foreign Application Priority Data

Jan. 10, 2024 (JP) ................................. 2024-001953

(51) Int. Cl.
G03G 15/04 (2006.01)
G03G 15/00 (2006.01)
(Continued)

(52) U.S. Cl.
CPC ..... G03G 15/043 (2013.01); G03G 15/04072 (2013.01); G03G 15/305 (2013.01);
(Continued)

(58) Field of Classification Search
CPC ............. G03G 15/5041; G03G 15/043; G03G 15/5058; G03G 15/0115; G03G 15/04072;
(Continued)

(56) References Cited

U.S. PATENT DOCUMENTS

| | | | |
|---|---|---|---|
| 2002/0063770 A1* | 5/2002 | Takesue | B41J 2/473 347/234 |
| 2006/0092264 A1 | 5/2006 | Matsuzaki et al. | 347/233 |

(Continued)

FOREIGN PATENT DOCUMENTS

| | | | | |
|---|---|---|---|---|
| JP | 2003098773 A | * | 4/2003 | G03G 15/5041 |
| JP | 2006-123391 A | | 5/2006 | |

(Continued)

*Primary Examiner* — Robert B Beatty

(74) *Attorney, Agent, or Firm* — Stein IP, LLC

(57) ABSTRACT

An image forming apparatus includes an image forming section, an optical scanning device, an image density sensor, and a control unit. The optical scanning device scans the surface of the image carrying member with light emitted from light sources to form an electrostatic latent image. The control unit can perform light amount calibration to adjust the exposure amount of the light scanning device based on the density of a reference image detected by the image density sensor. The reference image used for light amount calibration has a dot pattern in which as many individual dots as there are light sources are arrayed at regular intervals in the main scanning direction. The dot pattern is formed repeatedly in the main and sub scanning directions. The dots forming the dot pattern are arranged at different positions in the sub scanning direction to be displaced in units of pixels from each other.

2 Claims, 11 Drawing Sheets

(51) Int. Cl.

| | |
|---|---|
| *G03G 15/043* | (2006.01) |
| *G03G 15/30* | (2006.01) |
| *G03G 15/32* | (2006.01) |
| *G06K 15/02* | (2006.01) |
| *G06K 15/12* | (2006.01) |
| *H04N 1/00* | (2006.01) |

(52) U.S. Cl.
CPC ....... *G03G 15/326* (2013.01); *G03G 15/5041* (2013.01); *G06K 15/027* (2013.01); *G06K 15/1261* (2013.01); *G03G 2215/00042* (2013.01); *G03G 2215/0404* (2013.01); *H04N 1/00045* (2013.01)

(58) Field of Classification Search
CPC ....... G03G 15/04054; G03G 15/04063; G03G 15/28; G03G 15/305; G03G 15/32; G03G 15/326; G03G 2215/00037; G03G 2215/00042; G03G 2215/00059; G03G 2215/0407; G03G 2215/0409; G03G 2215/0412; G03G 2215/0414; G06K 15/027; G06K 15/1209; G06K 15/1247; G06K 15/261; H04N 1/00045
USPC .......................................................... 399/49
See application file for complete search history.

(56) References Cited

U.S. PATENT DOCUMENTS

| | | | |
|---|---|---|---|
| 2010/0098444 A1* | 4/2010 | Nakahara ............. | G03G 15/326 |
| | | | 399/40 |
| 2020/0198365 A1* | 6/2020 | Ochiai ................... | B41J 2/2135 |
| 2023/0103182 A1* | 3/2023 | Ishida ............... | G03G 15/5041 |
| | | | 399/49 |

FOREIGN PATENT DOCUMENTS

| | | | |
|---|---|---|---|
| JP | 2012002925 A | * | 1/2012 |
| JP | 2020013039 A | * | 1/2020 |

* cited by examiner

-Related art-

DP1

DP2

DP3

DP4

DP5

DP6

DP7

DP8

DP9

1

IMAGE FORMING APPARATUS THAT CAN PERFORM LIGHT AMOUNT CALIBRATION TO ADJUST THE DENSITY OF A HALF TONE IMAGE

INCORPORATION BY REFERENCE

This application is based on and claims the benefit of priority from Japanese Patent Application No. 2024-001953 filed on Jan. 10, 2024, the contents of which are hereby incorporated by reference.

BACKGROUND

The present disclosure relates to an imaging forming apparatus employing an electrophotographic process, and relates in particular to image density correction for adjustment of the density of halftone images.

With an electrophotographic image forming apparatus, the density of the formed image may change due to changes in a photosensitive member and in toner over time, changes in temperature and humidity around the apparatus, and other factors. Thus, there are known technologies intended to stabilize image formation against such changes by performing image density correction (calibration) with predetermined timing.

There are two types of image density correction: density adjustment for adjustment of the density of solid images (bias calibration) and density adjustment for adjustment of the density of halftone images (light amount calibration). Specifically, a patch (reference image) of a solid or halftone image is formed on the photosensitive drum, and its density level is detected with an image density sensor (ID sensor) disposed near the photosensitive drum or an intermediate transfer belt to calculate the deviation from the target density. Then, according to the deviation, the target density is aimed at by changing the developing voltage or the light amount of an optical scanning device. Performing the above two types of image density allows stabilization of the image density from a low-density region to a high-density region.

Here, in a multi-beam optical scanning device that uses multiple laser diodes to scan the photosensitive drum, if a beam pitch in the sub scanning direction deviates, a dot pattern has uneven density depending on the positional relationship between the image pattern and the laser diodes that shine light to the image pattern, causing the image density to change.

SUMMARY

According to one aspect of the present disclosure, an image forming apparatus includes an image forming section, an optical scanning device, an image density sensor, and a control unit. The image forming section includes an image carrying member having a photosensitive layer formed on its surface, a charging device that electrostatically charges the surface of the image carrying member, and a developing device that has a developer carrying member carrying developer containing toner and that develops an electrostatic latent image formed on the image carrying member into a toner image. The image forming section performs image formation by using the toner. The optical scanning device has a plurality of light sources, and scans the surface of the image carrying member electrostatically charged by the charging device with light emitted from the light sources to form an electrostatic latent image with reduced electrostatic charge. The image density sensor detects the density of the toner image formed in the image forming section. The control unit controls the image forming section and the optical scanning device. The control unit detects the density of a reference image for image density correction formed in the image forming section with the image density sensor and, based on the result of the detection, the control unit can perform image density correction including: bias calibration in which the control unit, adjusts the developing voltage applied to the developer carrying member and thereby adjusts the density of a solid image; and light amount calibration in which the control unit adjusts the exposure amount of the optical scanning device and thereby adjusts the density of a halftone image. The reference image used for light amount calibration has a dot pattern in which individual dots of which the number is larger than the number of light sources are arrayed at regular intervals in a main scanning direction, which is a scanning direction of the optical scanning device. The dot pattern is formed repeatedly in the main scanning direction and in a sub scanning direction, which is orthogonal to the main scanning direction, and the dots forming the dot pattern are arranged at different positions from each other in the sub scanning direction so as to be displaced in units of pixels from each other.

BRIEF DESCRIPTION OF THE DRAWINGS

FIG. 6 is a diagram showing one example of a conventional dot pattern used for light amount calibration.

DETAILED DESCRIPTION

Figure 1:
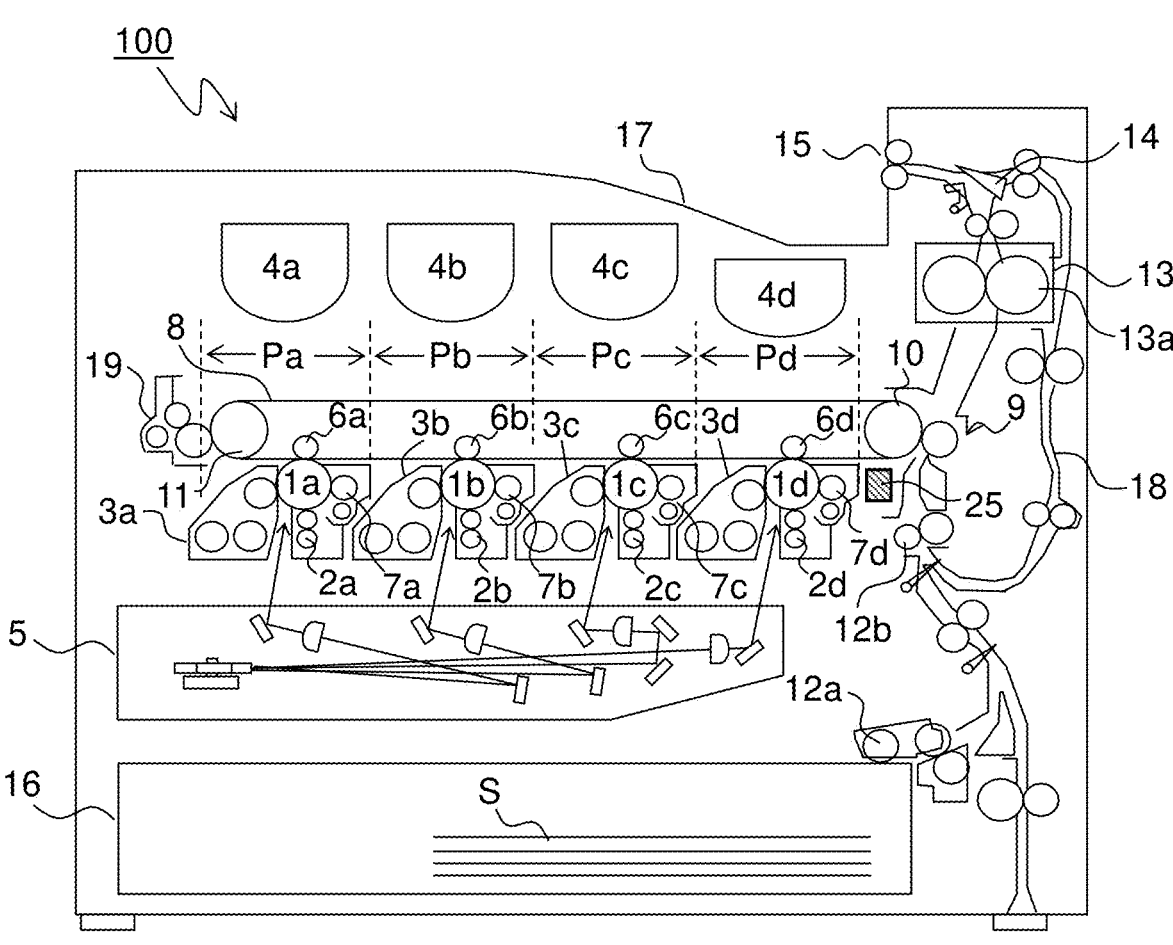
FIG. 1 is a schematic diagram showing the internal construction of an image forming apparatus according to one embodiment of the present disclosure.
Figure 2:
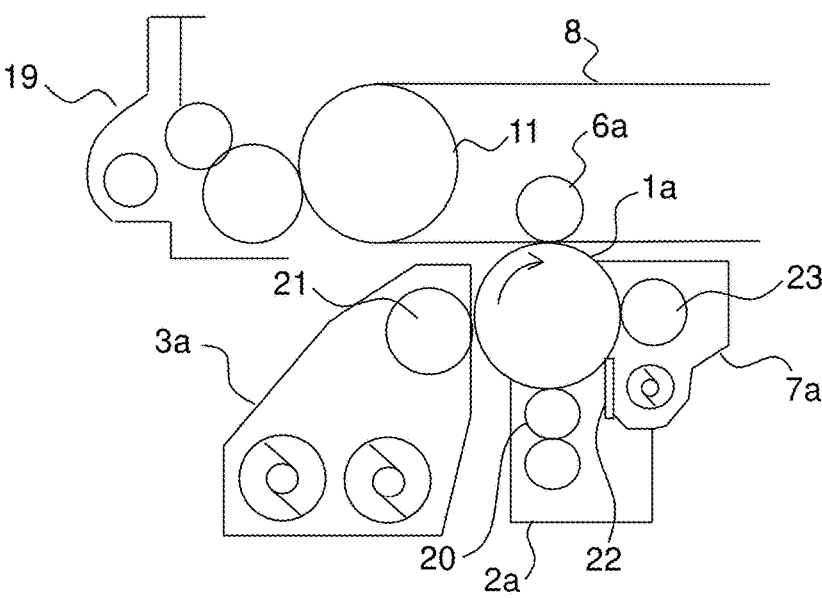
FIG. 2 is an enlarged view around an image forming section in FIG. 1.

An embodiment of the present disclosure will be described below with reference to the accompanying drawings. FIG. 1 is a schematic diagram showing the construction of an image forming apparatus 100 according to one embodiment of the present disclosure. FIG. 2 is an enlarged view around an image forming section Pa in FIG. 1.

The image forming apparatus 100 shown in FIG. 1 is what is called a tandem-type color printer and has the following configuration. In a body of the image forming apparatus 100, four image forming sections Pa, Pb, Pc, and Pd are disposed in this order from upstream (left side in FIG. 1) along the conveying direction. These image forming sections Pa to Pd are provided to correspond to four different colors (yellow, cyan, magenta, and black) respectively and sequentially form a yellow, a cyan, a magenta, and a black image respectively, each through the processes of electrostatic charging, exposure to light, image development, and image transfer.

In these imaging forming sections Pa to Pd, photosensitive drums 1a, 1b, 1c, and 1d are disposed that carry visible images (toner images) of the different colors. Furthermore, an intermediate transfer belts 8 rotating in the counterclockwise direction in FIG. 1 is provided adjacent to the image forming section Pa to Pd. The toner images formed on these photosensitive drums 1a to 1d are sequentially transferred to the intermediate transfer belt 8, which moves while in contact with the photosensitive drums 1a to 1d, and are then transferred at once to a sheet S of paper as one example of a recording medium at a secondary transfer roller 9. Furthermore, the toner images are fixed to the sheet S in the fixing section 13, and then the sheet S is discharged out of the body of the image forming apparatus 100. With the photosensitive drums 1a to 1d rotated in the clockwise direction in FIG. 1, an image forming process is performed for each of the photosensitive drums 1a to 1d.

The sheet S to which the toner images are transferred is stored in a sheet cassette 16 disposed in a lower part of the body of the image forming apparatus 100, and is conveyed to the secondary transfer roller 9 via a sheet feed roller 12a and a pair of registration rollers 12b. A belt with no seam (seamless belt) is typically used as the intermediate transfer belt 8.

Next, a description will be given of the image forming sections Pa to Pd. The image forming section Pa will be described in detail below. For the other image forming sections Pb to Pd, which are basically configured similarly, no separate description will be given. As shown in FIG. 2, around the photosensitive drum 1a, there are disposed a charging device 2a, a developing device 3a, and a cleaning device 7a along the drum rotation direction (clockwise direction in FIG. 2), and across the intermediate transfer belt 8, a primary transfer roller 6a is disposed. Moreover, a belt cleaning unit 19 is disposed on the upstream side of the photosensitive drum 1a in the rotation direction of the intermediate transfer belt 8, opposite a tension roller 11 across the intermediate transfer belt 8.

Next, a description will be given of an image forming procedure on the image forming apparatus 100. When an instruction to start image formation is entered by a user, first, the photosensitive drums 1a to 1d starts to be rotated by the main motor 61 (see, FIG. 5), and a charging roller 20 in the charging devices 2a to 2d electrostatically charges the surfaces of the photo sensitive drums 1a to 1d uniformly. Next, from an optical scanning device 5 light beams (laser beams) are shone onto the surfaces of the photosensitive drums 1a to 1d so that electrostatic latent images according to an image signal are formed on the photosensitive drums 1a to 1d.

The developing devices 3a to 3d are loaded with predetermined amounts of yellow, magenta, cyan, and black toner, respectively. When, with the progress of the formation of toner images as will be described later, the proportion of toner in the two-component developer loaded in the developing devices 3a to 3d falls below a prescribed value, toner is supplied from toner containers 4a to 4d to the developing device 3a to 3d. This toner in the developer is supplied onto the photosensitive drums 1a to 1d by the developing rollers 21 in the developing devices 3a to 3d and electrostatically adheres to them. Thus, toner images are formed according to the electrostatic latent images formed by exposure to light from the optical scanning device 5.

Then, the primary transfer rollers 6a to 6d produce an electric field with a predetermined primary transfer voltage between themselves and the photosensitive drums 1a to 1d to primarily transfer the yellow, magenta, cyan and black toner images on the photosensitive drums 1a to 1d to the intermediate transfer belt 8. These four-color images are formed with a predetermined positional relationship previously set for predetermined full-color image formation. The toner and the like remaining on the surfaces of the photosensitive drums 1a to 1d are removed by a cleaning blade 22 and a rubbing roller 23 in the cleaning devices 7a to 7d.

When a belt driving motor 63 (see, FIG. 5) rotates a driving roller 10 and the intermediate transfer belt 8 starts to rotate in the counterclockwise direction, a sheet S is conveyed, with predetermined timing, from the pair of registration rollers 12b to the secondary transfer roller 9 provided adjacent to the intermediate transfer belt 8, and the full color image is transferred. The sheet S having the toner images transferred to it is conveyed to the fixing section 13. The toner remaining on the surface of the intermediate transfer belt 8 is removed by the belt cleaning unit 19.

The sheet S conveyed to the fixing section 13 is heated and pressed by a pair of fixing rollers 13a, so that the toner images are fixed to the surface of the sheet S to form the predetermined full-color image. The sheet S having the full-color image formed on it has its conveyance direction switched by a branch section 14 which branches into a plurality of directions to be discharged as it is (or after being conveyed to a duplex conveyance passage 18 and subjected to duplex printing) to a discharge tray 17 by a pair of discharge rollers 15.

An image density sensor 25 is disposed opposite the drive roller 10 across the intermediate transfer belt 8. As the image density sensor 25, an optical sensor with a light emitting element comprising an LED or the like and a light receiving element comprising a photodiode or the like is typically used. In measuring the toner adhesion amount on the intermediate transfer belt 8, shining measurement light from the light emitting element to a patch image (reference image) formed on the intermediate transfer belt 8 results in the measurement light entering the light receiving element as light reflected by the toner and light reflected by the belt surface.

The light reflected from the toner and the light reflected from the belt surface include regularly reflected light and irregularly reflected light. The regularly and irregularly reflected light are separated by a polarization splitting prism and are then incident on separate light receiving elements. The light receiving elements photoelectrically convert the received regularly and irregularly reflected light to yield output signals to a control unit 90 (see FIG. 5).

Figure 3:
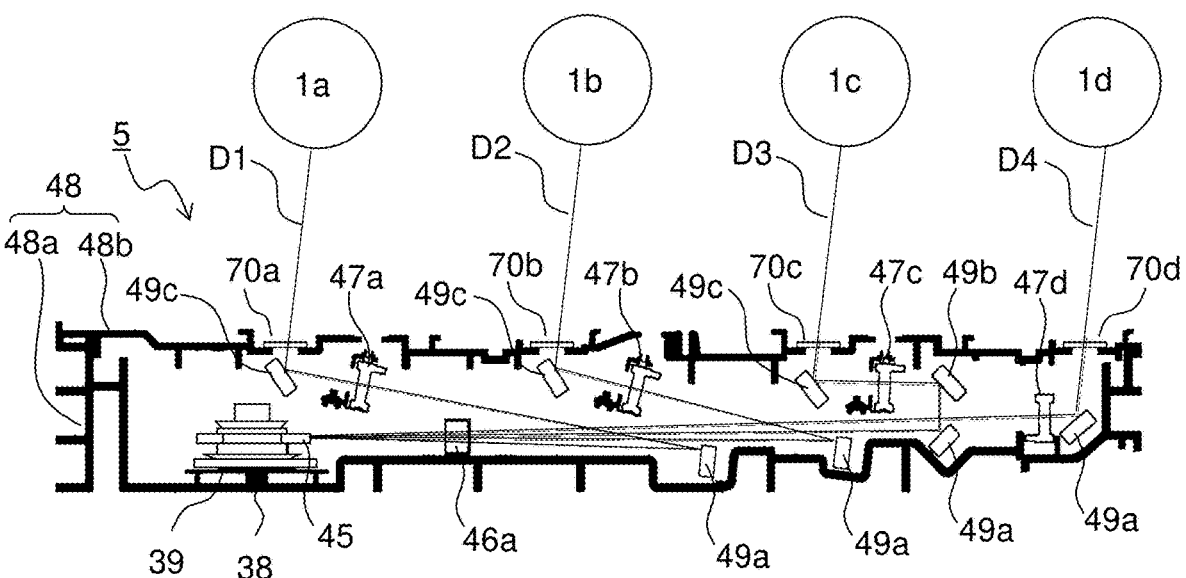
FIG. 3 is a side sectional view showing the internal structure of an optical scanning device in the image forming apparatus.

FIG. 3 is a side sectional view showing the internal construction of the optical scanning device 5 according to one embodiment of the present disclosure. As shown in FIG. 3, the optical scanning device 5 includes a housing 48. The housing 48 has a body portion 48a and a lid portion 48b. A polygon mirror 45 is disposed on the bottom surface of the body portion 48a. In this embodiment, the polygon mirror 45 is a rotary multi-face mirror in a regular polygonal shape with a plurality of deflecting (reflecting) surfaces on its side and is rotated at a predetermined speed by a polygon motor 38. The polygon motor 38 is fixed to a motor support plate 39, which is fixed to the bottom surface of the body portion 48a.

Inside the housing 48 are arranged a light source unit 26 (see FIG. 4), a collimator lens, an aperture, a cylindrical lens (none is shown), a first scanning lens 46a, second scanning lenses 47a to 47d, and flat mirrors 49a to 49c are disposed. The first scanning lens 46a and the second scanning lenses 47a to 47d have fθ characteristics and focus the laser beams D1 to D4 deflected and reflected by the polygon mirror 45 to on the photosensitive drums 1a to 1d. The flat mirrors 49a to 49c are disposed on the optical paths of the laser beam D1 to D4 from the polygon mirror 45 to the photosensitive drums 1a to 1d.

The scanning operation with the laser beams D1 and D2 by the optical scanning device 5 configured as described above will be described. First, the laser beams D1 and D2 emitted from the light source unit 26 are formed into approximately parallel light beams by the collimator lens, and are made to have a predetermined optical path width by the aperture. Next, the approximately parallel laser beams D1 and D2 are shone into the cylindrical lens. The laser beams D1 and D2 having entered the cylindrical lens emerge, in its main scanning section, as they are, that is, as approximately parallel light beams but, in the sub scanning direction, so as to converge, to be focused as a line image on the deflecting surface of the polygon mirror 45. To facilitate optical path splitting between the two laser beams D1 and D2 deflected by the polygon mirror 45, these laser beams D1 and D2 are configured to strike the deflecting surface at different angles in the sub scanning direction.

The laser beams D1 and D2 incident on the polygon mirror 45 are deflected at a constant angular velocity by the polygon mirror 45 and are then deflected at a constant velocity by the first scanning lens 46a. The laser beams D1 and D2 having passed through the first scanning lens 46a are turned back by the flat mirror 49a disposed in their respective optical paths, with the laser beam D1 entering the second scanning lens 47a and the laser beam D2 entering the second scanning lens 47b, and are deflected at a constant velocity by the second scanning lenses 47a and 47b. The laser beams D1 and D2 having undergone constant-velocity deflection are turned back by the last flat mirror 49c disposed in their respectively optical paths, and pass through windows portions 70a and 70b formed in a lid portion 48b covering the opening of the body portion 48a to be distributed to the photosensitive drums 1a and 1b.

Likewise, the laser beams D3 and D4 emitted from the light source unit 26 pass through the collimator lens, the aperture and the cylindrical lens, are then deflected at a constant angular velocity by the polygon mirror 45, and are then deflected at a constant velocity by the first scanning lens 46a. The laser beam D3 having passed through the first scanning lens 46a is turned back twice by the flat mirrors 49a and 49b disposed in the optical path and then the laser beam D3 enters the second scanning lens 47c, while the laser beam D4 having passed through the first scanning lens 46a enters the second scanning lens 47d, so that they are each deflected at a constant velocity. Then, the laser beam D3 is once again tuned back by the last flat mirror 49c and the laser beam D4 is once again tuned back by the flat mirror 49a so that they pass through the window portions 70c and 70d formed in the lid 48b portion to be distributed to the photosensitive drums 1c and 1d.

The polygon mirror 45, the first scanning lens 46a, the second scanning lenses 47a to 47d, and the flat mirrors 49a to 49c constitute a scanning optical system that, while performing scanning with the laser beams D1 to D4, guides them onto photosensitive drums 1a to 1d.

Figure 4:
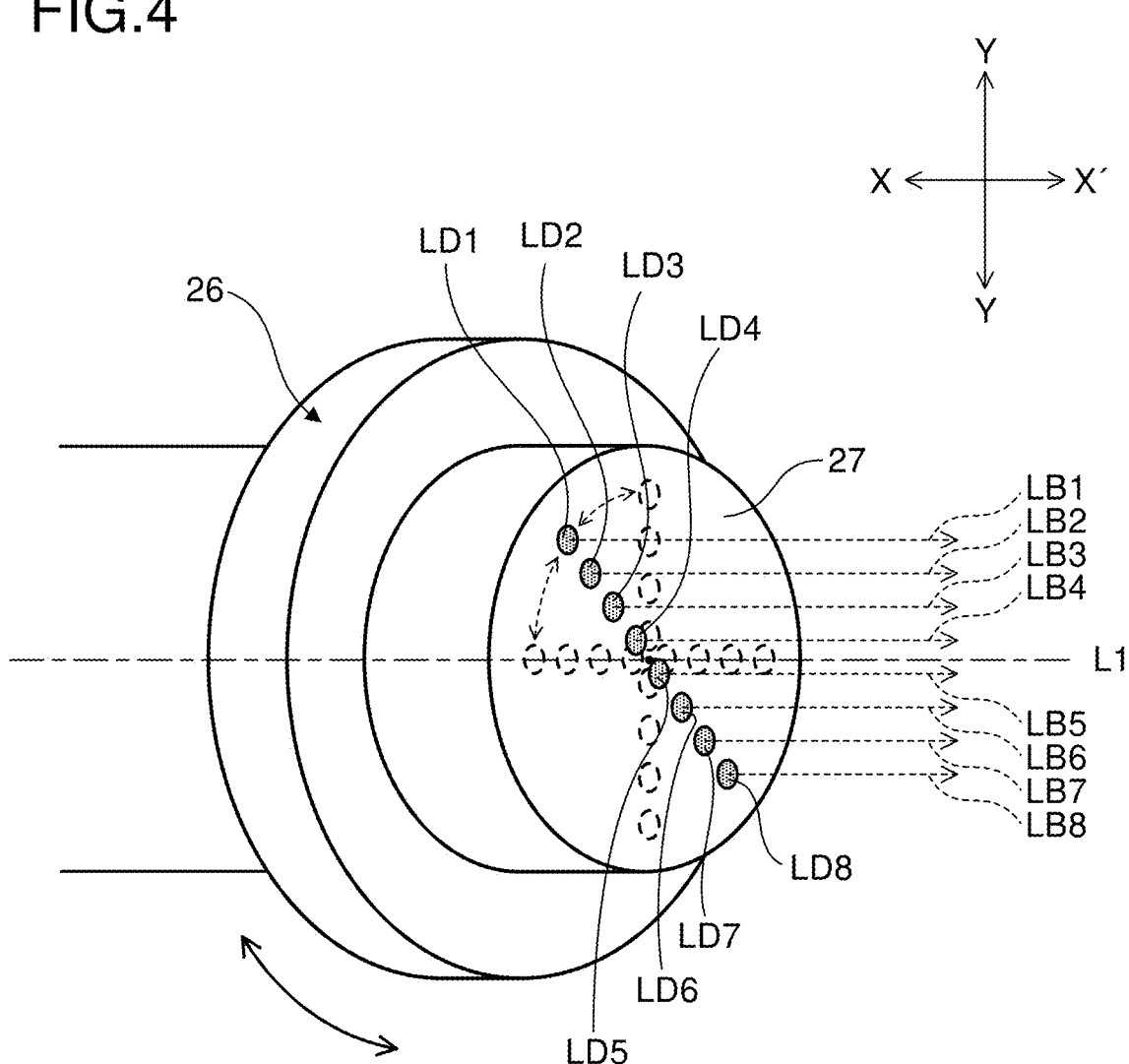
FIG. 4 is a perspective view of a light source unit in the optical scanning device.

FIG. 4 is a perspective view showing the light source unit 26. The optical scanning device 5 includes four light source units 26 to irradiate the photosensitive drums 1a to 1d with the laser beams D1 to D4 respectively.

Figure 5:
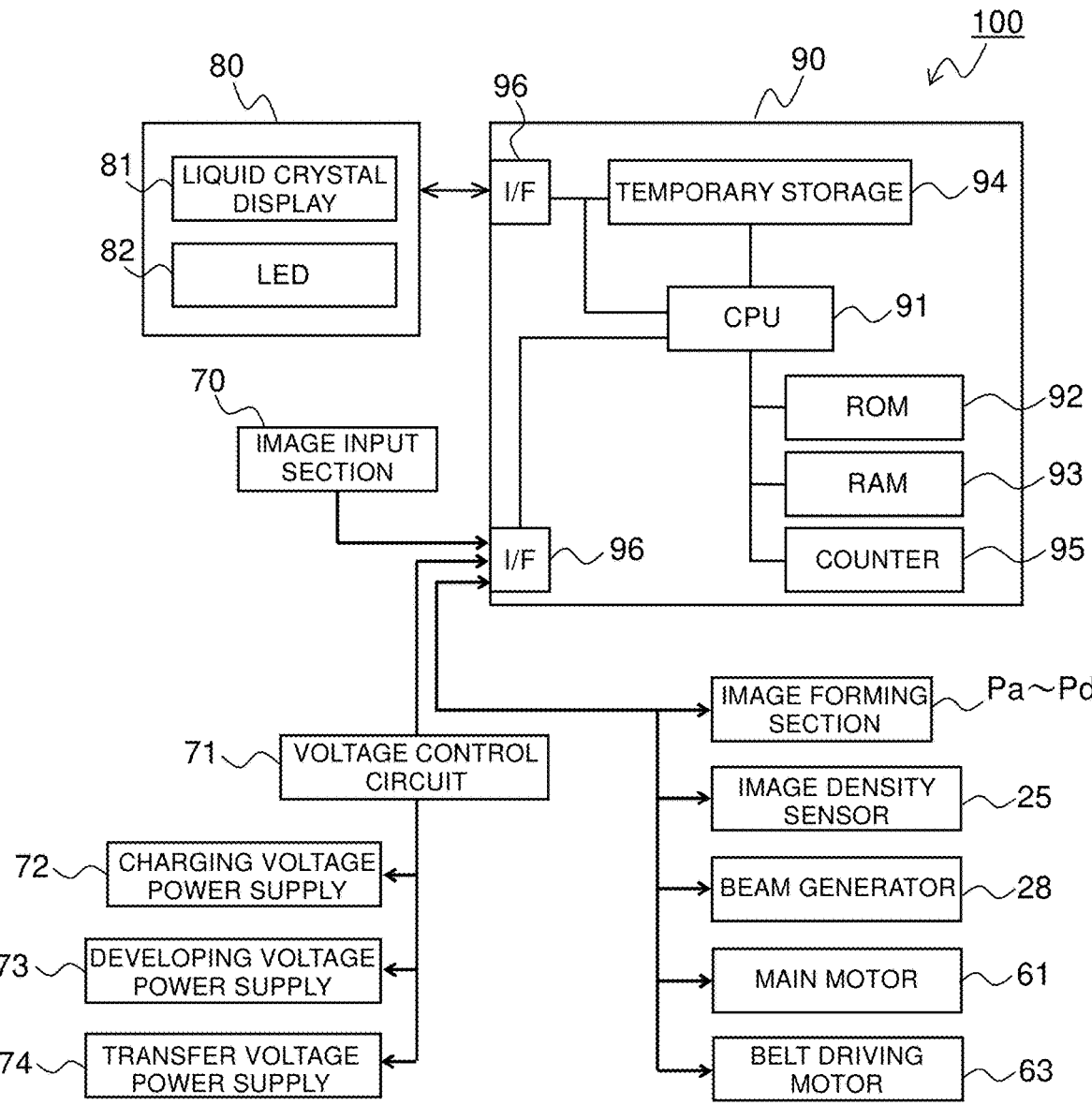
FIG. 5 is a block diagram showing one example of control paths in the image forming apparatus of the embodiment.

The light source unit 26 has a tip surface 27, laser diodes LD1 to LD8 (light sources), and a beam generator 28 (see FIG. 5). As shown in FIG. 4, the tip surface 27 of the light source unit 26 in its longitudinal direction is a circular flat surface. The light source unit 26 is fixed in position with the intervals between the laser diodes LD1 to LD8 in the sub scanning direction adjusted by rotating the light source unit 26 circumferentially about, as a rotation axis, an axis that passes through the center of the tip surface 27 (central axis L1) among normal lines to the tip surface 27.

The laser diodes LD1 to LD8 are disposed in a straight line at equal intervals along a diametrical direction of the light source unit 26. The beam generator 28 generates light beams LB (hereinafter also referred to as light beams LB1 to LB8 individually) emitted separately from the laser diodes LD1 to LD8 based on image information transmitted from the control unit 90 (see FIG. 5).

When the light source unit 26 is subjected to rotation adjustment to adjust the intervals between the laser diodes LD1 to LD8 in the sub scanning direction, the intervals of laser diodes LD1 to LD8 in the main scanning direction change. With the laser diodes LD1 to LD8 disposed in a straight line parallel to the sub scanning direction (vertical direction in the diagram), the intervals between the laser diodes LD1 to LD8 in the main scanning direction is the smallest. On the other hand, with the laser diodes LD1 to LD8 disposed in a straight line parallel to the main scanning direction (left-right direction in the diagram), the intervals between the laser diodes LD1 to LD8 in the main scanning direction is the largest (for both, see the broken lines in FIG. 4).

FIG. 5 is a block diagram showing one example of control paths in the image forming apparatus 100 of the embodiment. The control paths in the entire image forming apparatus 100 are complicated to achieve various kinds of control for different parts of the apparatus during the use of the image forming apparatus 100. For simplicity's sake, the following description focuses on those control paths that are necessary for implementation of the present disclosure.

The control unit 90 at least includes a CPU (central processing unit) 91 as a central arithmetic processor, a ROM (read-only memory) 92 as a memory for reading only, a RAM (random-access memory) 93 as a readable and writeable memory, a temporary memory 94 for temporarily storing image data and the like, a counter 95, and a plurality of (here, two) I/Fs (interfaces) 96 that transmit control signals to different devices in the image forming apparatus 100 and that receive input signals from an operation unit 80. The control unit 90 can be arranged anywhere inside the body of the image forming apparatus 100

The ROM 92 stores a program for controlling the image forming apparatus 100 and data and the like that are not changed during the use of the image forming apparatus 100, such as numerical values necessary for control. The RAM 93 stores necessary data produced during the control of the image forming apparatus 100 and data temporarily necessary for the control of the image forming apparatus 100. The RAM 93 (or ROM 92) also stores an image density correction table, look-up tables, and the like used for calibration. The counter 95 cumulatively counts the number of printed sheets.

The control unit 90 transmits control signals from the CPU 91 to different parts and blocks in the image forming apparatus 100 through the I/Fs 96. On the other hand, from those parts and blocks, signals indicating their status and input signals are transmitted to the CPU 91 through the I/Fs 96. For example, the parts and blocks controlled by the control unit 90 include the image forming sections Pa to Pd, the image density sensor 25, the beam generator 28, the main motor 61, the belt driving motor 63, an image input section 70, a voltage control circuit 71, and the operation unit 80.

The image input section 70 is a receiving section that receives image data transmitted to the imaging device 100 from a PC (personal computer) or other host device. An image signal input from the image input section 70 is converted into a digital signal and is then fed to the temporary memory 94.

The voltage control circuit 71 is connected to a charging voltage power supply 72, a developing voltage power supply 73, and a transfer voltage power supply 74, and operates these power supplies according to an output signal from the control unit 90. These power supplies operate according to control signals from the voltage control circuit 71. The charging voltage power supply 72 applies a predetermined charging voltage to the charging rollers 20 in the charging device 2a to 2d. The developing voltage power supply 73 applies a predetermined developing voltage, which has a developing AC voltage superimposed on a developing DC voltage, to the developing rollers 21 in the developing devices 3a to 3d. The transfer voltage power supply 74 applies predetermined transfer voltages to the primary transfer rollers 6a to 6d and a secondary transfer roller 9 respectively.

The operation unit 80 has a liquid crystal display 81 and LEDs 82 indicating various states. The user operates a stop/clear button on the control unit 80 to stop image formation, and operates a reset button to set the various settings on the image forming apparatus 100 back to default settings. The LCD display 81 indicates the state of the image forming apparatus 100 as well as the image forming status and the number of copies printed. The various settings on the image forming apparatus 100 are made from a printer driver on the PC.

In the image forming apparatus 100, even if the developing voltage in the developers 3a to 3d and the light amount setting in the optical scanning device 5 are appropriately adjusted to obtain the desired halftone density at the start of use, as printing (durability printing) is performed over a long period of time, the density of halftone images may change with changes over time in the developers 3a to 3d and the optical scanning device 5.

To cope with that, the image forming apparatus 100 performs image density adjustment (calibration) at a predetermined timing (e.g., at a timing when the cumulative number of printed sheets reaches a predetermined number) to keep the image density constant. In calibration, a plurality of reference images with toner adhesion amounts varied in steps are formed on the intermediate transfer belt 8. The formed reference images are then read by the image density sensor 25 and, through comparison with a previously set reference density, the image forming conditions such as the charging voltage, the developing voltage, and the amount of exposure by the optical scanning device 5 are set for each color to make the image density equal to the target density.

There are two types of calibration: density adjustment for adjustment of the density of solid images (bias calibration) and density adjustment for adjustment of the density of halftone images (light amount calibration). Performing both bias calibration and light amount calibration allows stabilization of the image density from a low-density region to a high-density region.

Figure 6:
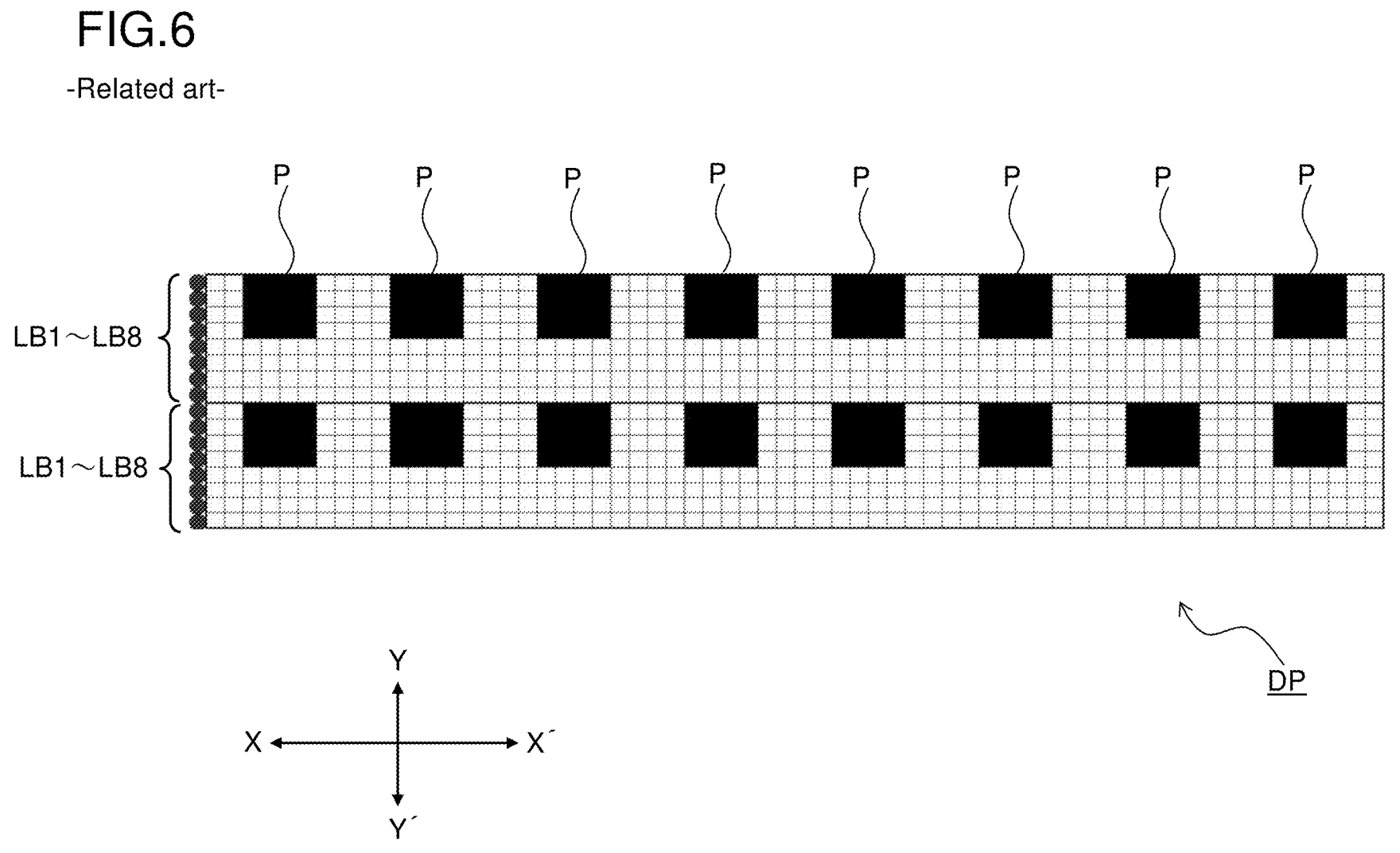

FIG. 6 is a diagram showing one example of a conventional dot pattern DP used for light amount calibration. While the description here takes a black dot pattern DP as an example, dot patterns DP of yellow, cyan, and magenta have quite the same configuration. FIG. 6 shows a case where image formation is performed with an optical scanning device 5 including a light source unit 26 having eight laser diodes LD1 to LD8 as shown in FIG. 4 in an ideal state where there is no misalignment in the scanning positions of the beams (light beams LB1 to LB8).

As shown in FIG. 6, the dot pattern DP has 4×4-pixel dots P arrayed at intervals (pitch) of four pixels in the main scanning direction (XX' direction) and the sub scanning direction (YY' direction). Thus, with no beam scanning position misalignment, the light beams LB1 to LB4 emitted from the laser diodes LD1 to LD4 are used to write (by exposure to light) the dot pattern DP, and the laser diodes LD5 to LD8 (light beams LB5 to LB8) are not used to write the dot pattern DP.

Figure 7:
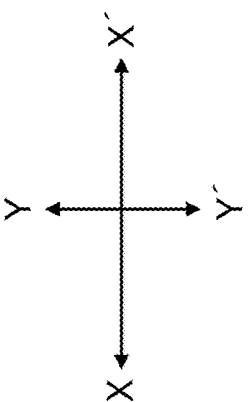
FIG. 7 is a diagram showing a state where, from the state shown in FIG. 6, the beam scanning positions are displaced in the main and sub scanning directions.

FIG. 7 is a diagram showing a state where, from the state shown in FIG. 6, the beam scanning positions of the laser diodes LD1 to LD8 are displaced in the main and sub scanning directions. Durable printing, for example, causes beam scanning position misalignment in the sub and main scanning directions as shown at the left end of FIG. 7. With beam scanning position misalignment, the image density of the dots P changes significantly depending on the relationship between the image positions of the dots P and the beam scanning positions of light exposure.

Figure 8:
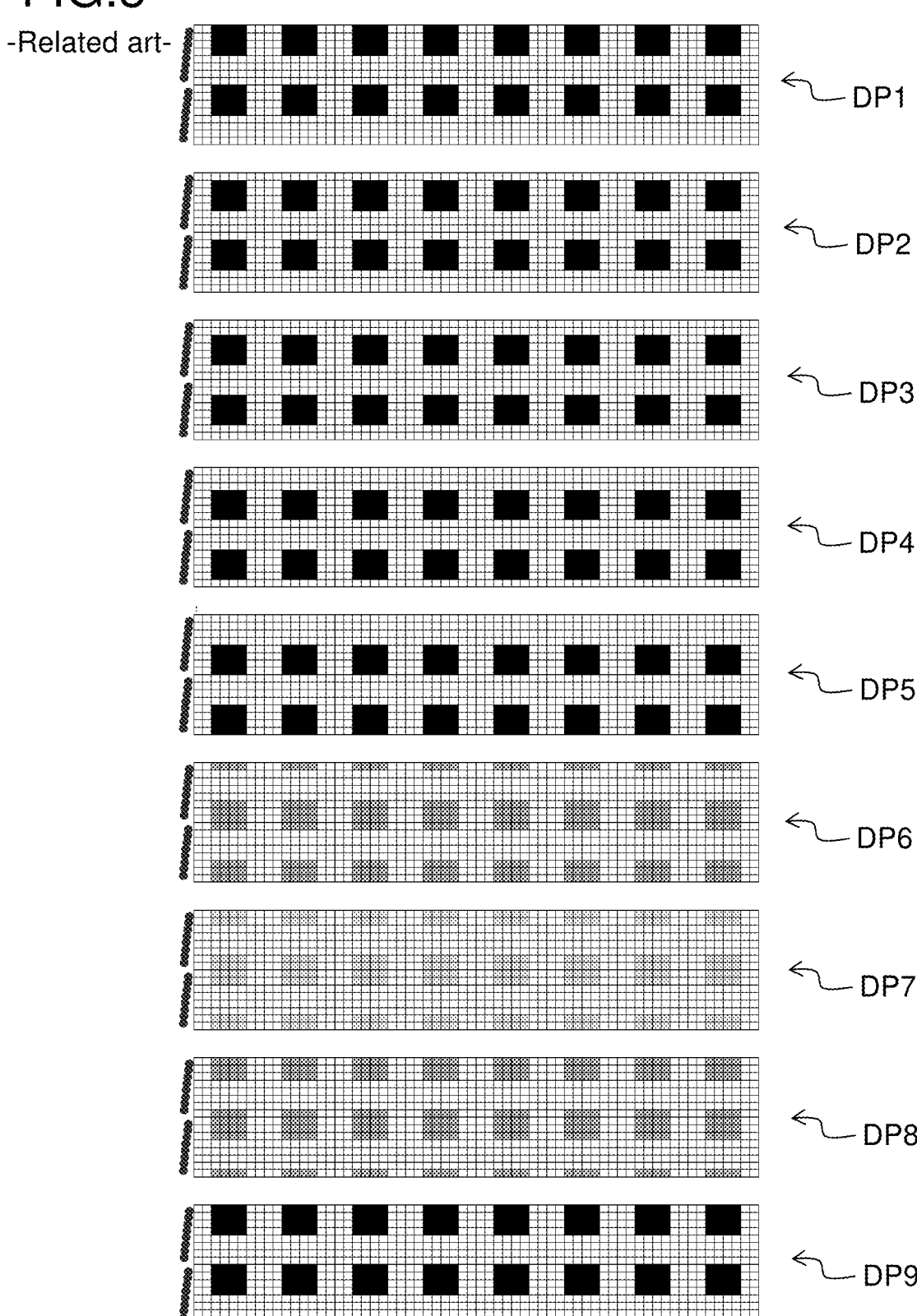
FIG. 8 is a diagram showing how, when the dot pattern is formed in the state shown in FIG. 7, the density of the dot pattern changes as it is displaced one pixel at a time in the sub scanning direction.

FIG. 8 is a diagram showing how, when the dot pattern DP is formed in the state shown in FIG. 7, the density of the dot pattern DP changes as the dot pattern DP is displaced one pixel at a time (per pattern repetition) in the sub scanning direction. As shown in FIG. 8, in the initial state with no beam scanning position misalignment (dot pattern DP1), the dots P are scanned by the beams (light beams LB1 to LB4) emitted from the corresponding laser diodes LD1 to LD4. Thus, there is no effect of beam scanning position misalignment, and the image density is in an ideal state.

When the dot pattern DP is displaced one pixel at a time in the sub scanning direction, up to +4 pixels (dot patterns DP 2 to DP5), scanning is performed with the beams (light beams LB1 to LB8) within the same scanning cycle. Thus, the effect of beam scanning position misalignment is small, and the image density does not differ significantly from the ideal state. However, at +5 pixels (dot pattern DP6), a part affected by beam scanning position misalignment (the gap between the optical beams LB8 and LB1) is located inside the dots P. Thus, the dots P become separated in the sub scanning direction, and the image density becomes lower.

At +6 pixels (dot pattern DP7), the effect of beam scanning position misalignment is most marked and a large difference in image density from the ideal state is observed. At +7 pixels (dot pattern DP8), the effect of beam scanning position misalignment becomes less significant as the part affected by beam scanning position misalignment (the gap between light beams LB8 and LB1) shifts toward outside the dots P. At +8 pixels (dot pattern DP9), the effect of beam scanning position misalignment disappears and the image density returns to the ideal state.

Since the positions of the dot patterns DP1 to DP9 change with each change in the timing of the image writing start position as for color displacement adjustment, even though the image density of the dots P do not change, the image density sensor 25 detects as if it does. This makes it impossible to perform accurate light amount calibration.

Figure 9:
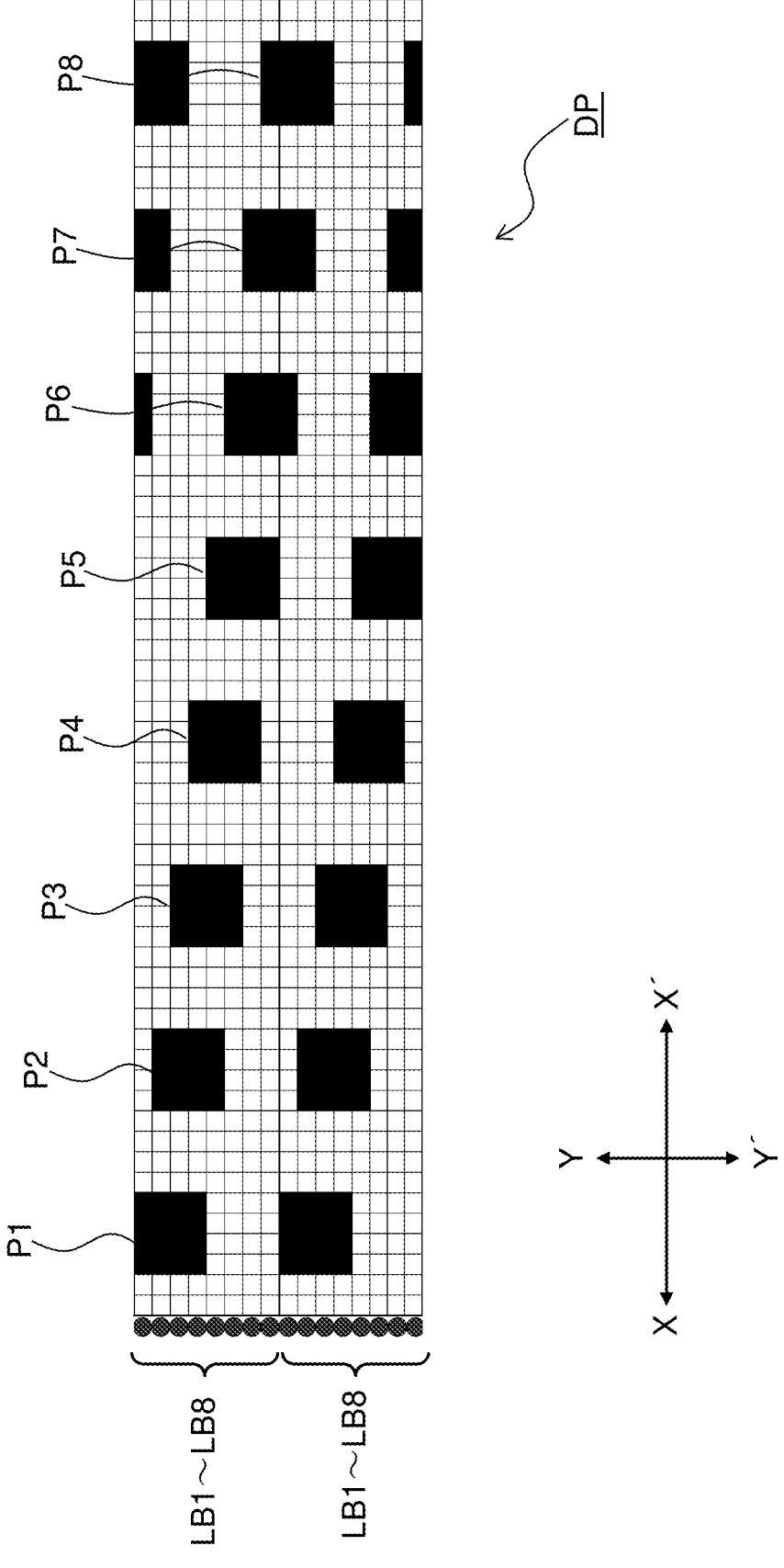
FIG. 9 is a diagram showing one example of a dot pattern used for light amount calibration in the image forming apparatus of this embodiment.

FIG. 9 is a diagram showing one example of a dot pattern DP used for light amount calibration in the image forming apparatus 100 of this embodiment. In this embodiment, a reference image (halftone image) for light amount calibration is formed using the dot pattern DP shown in FIG. 9. The dot pattern DP in FIG. 9 has dots P1 to P8 at different positions in the sub scanning direction. More specifically, dots P1 to P8 form a pattern that is displaced one pixel at a time (per dot) in the sub scanning direction from upstream to downstream in the main scanning direction (from left to right in FIG. 9). FIG. 9 shows a case where the scanning positions of the beams are in the ideal state, and the image density of all dots P1 to P8 is in the ideal state.

Figure 10:
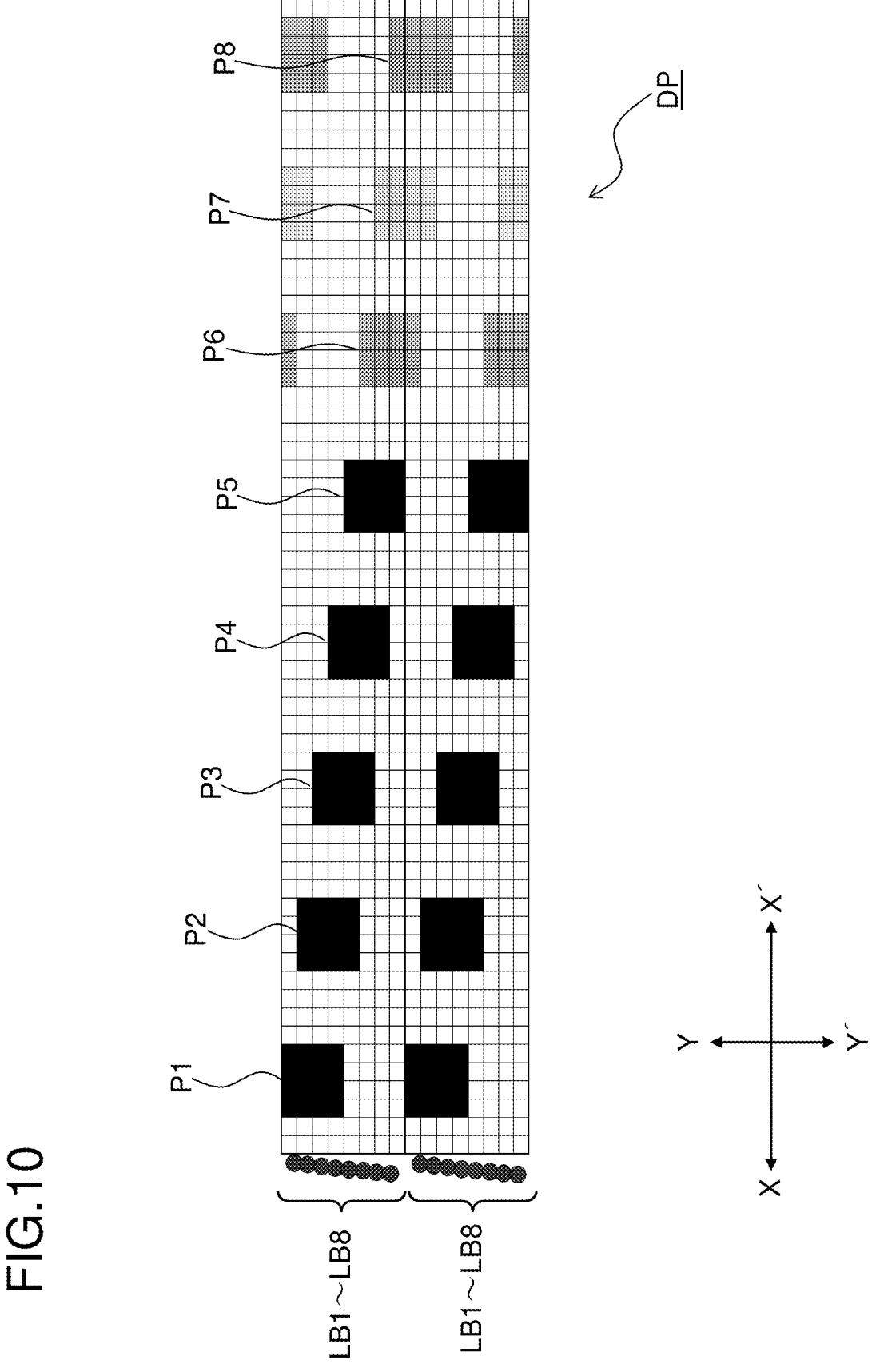
FIG. 10 is a diagram showing a case where, in the dot pattern of FIG. 9, the beam scanning positions are displaced in the sub and main scanning directions.

FIG. 10 is a diagram showing a case where, in the dot pattern DP of FIG. 9, the beam scanning positions of the laser diodes LD1 to LD8 are displaced in the sub and main scanning directions. As shown in FIG. 10, the part affected by beam scanning position misalignment (the gap between the optical beams LB8 and LB1) is located inside dots P6 to P8. Thus, the image density of dots P6 to P8 is lower.

Figure 11:
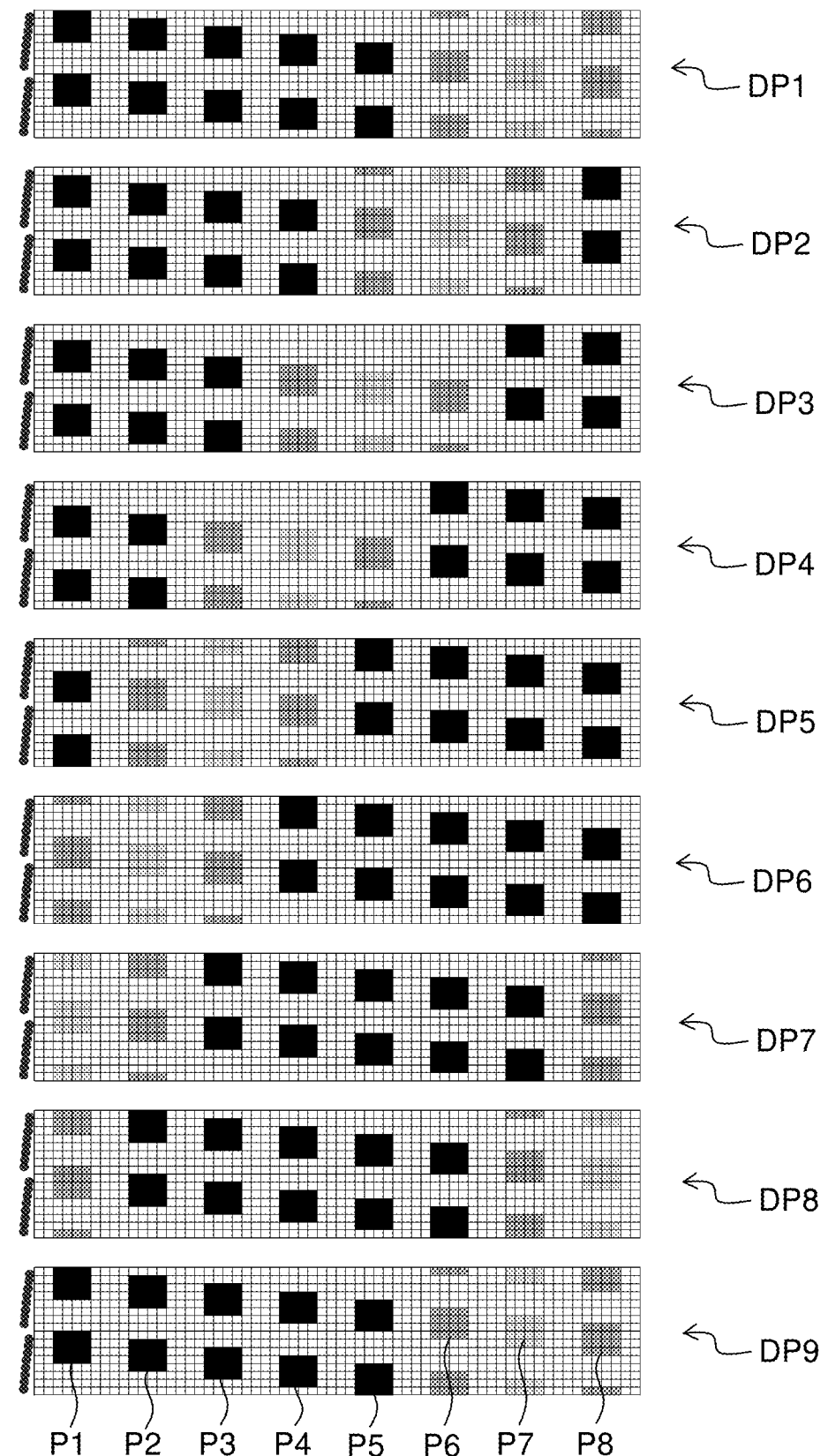
FIG. 11 is a diagram showing the change in the density of the dot pattern as observed when the dot pattern is formed in the state shown in FIG. 10 and the dot pattern is displaced one pixel at a time in the sub scanning direction.

FIG. 11 is a diagram showing the change in the density of the dot pattern DP as observed when the dot pattern DP is formed in the state shown in FIG. 10 and the dot pattern DP is displaced one pixel at a time (per pattern repetition) in the sub scanning direction. As shown in FIG. 11, in the initial state (dot pattern DP1), the image density of the three rightmost dots P6 to P8 is lower.

It is understood that, as the dot pattern DP is disposed one pixel at a time in the sub scanning direction, while the number of dots with lower image density remains the same (three), the positions of the dots with lower image density are displaced leftward one dot at a time. For example, at +1 pixel (dot pattern DP2), the image density of dots P5 to P7 is lower. At +2 pixels (dot pattern DP3), the image density of dots P4 to P6 is lower. Then, at +8 pixels (dot pattern DP9), the image density returns to the initial state (dot pattern DP1).

Thus, even when the positions in the dot pattern DP are displaced from the initial state (dot pattern DP1) in the sub scanning direction, the area ratio between parts with low and high image densities is constant (5:3 in this case). Thus, the average image density of the dot pattern DP as a whole is constant regardless of the change in the positions in the dot pattern DP in the sub scanning direction.

Although a density distribution occurs within the dot pattern DP, when a reference image (patch) for light amount calibration is formed, the density distribution is averaged across the reference image as a whole as a result of the pattern shown in FIG. 9 being repeated many times in the top-bottom and left-right directions with no gaps between them. Also, the spot size in image density detection by the image density sensor 25 is sufficiently large compared to the size of the dot pattern DP in FIG. 11. Thus, since the density distribution is averaged and detected, there is no risk of being affected by variation of the density distribution in the dot pattern DP when light amount calibration is performed.

By using the dot pattern DP shown in FIG. 9, it is possible to reduce the variation of the image density of the dot pattern DP between sessions of adjustment during light amount calibration even if the beam scanning positions (beam pitch) in the sub or main scanning direction are displaced.

Thus, it is possible to perform light amount calibration with high accuracy and to perform image formation with halftone images adjusted to appropriate image density. Also, there is no need to perform complex processing on the image data, and this helps simplify the control for performing light amount calibration.

Figure 12:
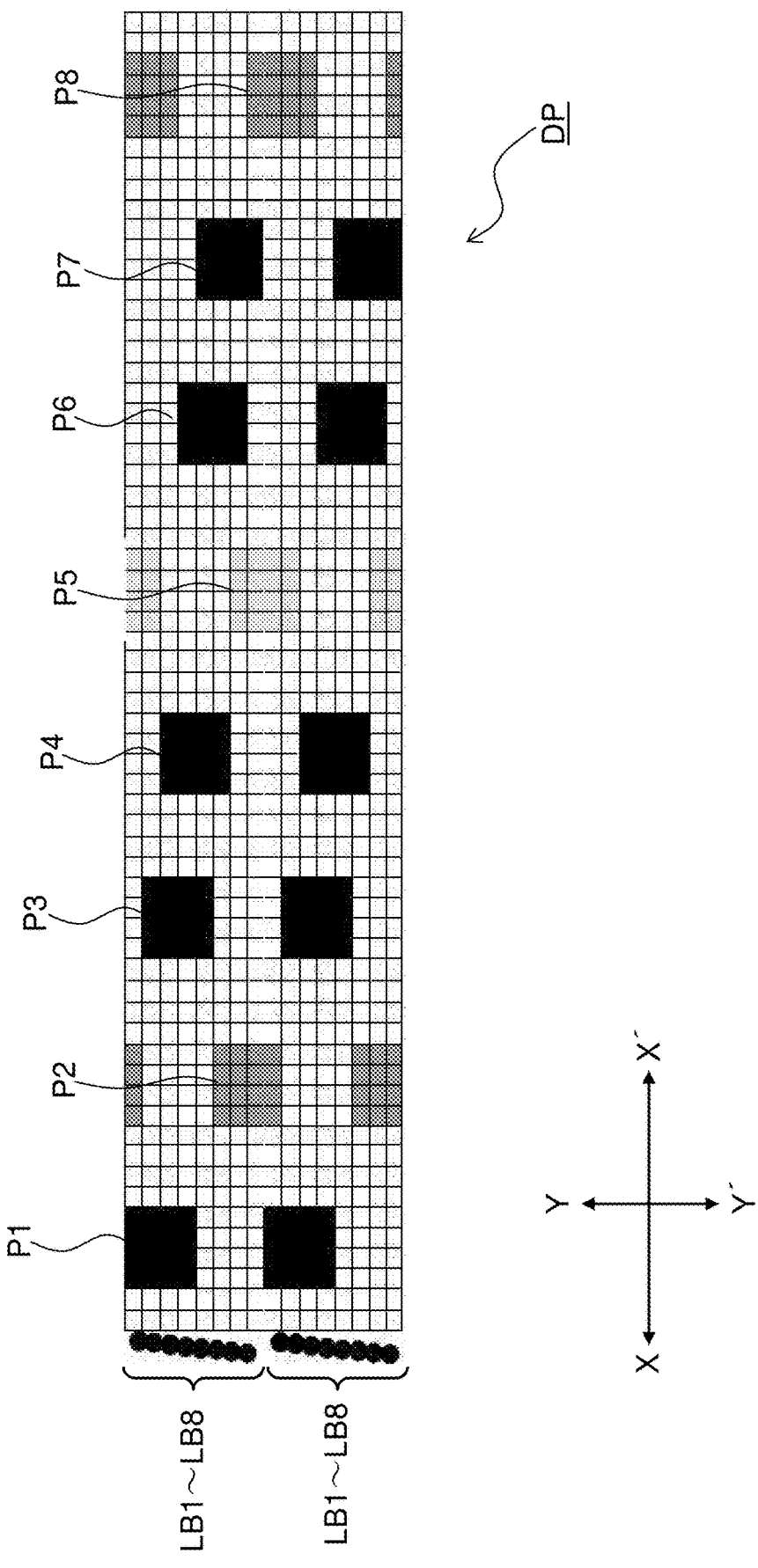
FIG. 12 is a diagram showing another example of a dot pattern used for light amount calibration in the image forming apparatus of the embodiment.

FIG. 12 is a diagram showing another example of a dot pattern DP used for light amount calibration in the imaging device 100 of the embodiment. The dot pattern DP shown in FIG. 12 is one observed in a case where the beam scanning positions of the laser diodes LD1 to LD8 are displaced in the sub and main scanning directions.

In the dot pattern DP shown in FIG. 12, dot P2, which is located downstream of dot P1 in the main scanning direction, is a dot displaced five pixels from dot P1 in the sub scanning direction (corresponding to dot P6 in FIG. 9). Dots P3 and P4, which are located downstream of dot P2, are dots displaced one and two pixels, respectively, from dot P1 in the sub scanning direction (corresponding to dots P2 and P3 in FIG. 9).

Dot P5, which is located downstream of dot P4, is a dot displaced six pixels from dot P1 in the sub scanning direction (corresponding to dot P7 in FIG. 9). Dots P6 and P7, which are located downstream of dot P5, are dots displaced three and four pixels, respectively, from dot P1 in the sub scanning direction (corresponding to dots P4 and P5 in FIG. 9).

Thus, in the dot pattern DP shown in FIG. 12, the amount of displacement of each dot in the sub scanning direction is determined such that the dots (dots P2, P5, and P8) of which the image density changes when the scanning positions of the light beams LB1 to LB8 emitted from the laser diodes LD1 to LD8 are displaced are distributed evenly in the main scanning direction in the dot pattern DP.

By using the dot pattern DP shown in FIG. 12, it is possible to average the density distribution within the dot pattern DP compared to the dot pattern DP shown in FIG. 9. This helps achieve further averaging compared to the density distribution of the reference image (patch) that contains many dot patterns DP. It is thus possible to further reduce the effect of the difference in density distribution within the dot patterns DP during light intensity calibration.

The embodiment described above is not meant to limit the scope of the present disclosure, which thus allows for any modifications without departure from the spirit of what is disclosed herein. For example, while the embodiment described above deals with an optical scanning device 5 that uses a light source unit 26 including eight laser diodes LD1 to LD8, any number of laser diodes can be provided so long as there are a plurality of them.

The dot pattern DP needs to have more dots than the number of laser diodes arrayed at regular intervals in the main scanning direction. For example, in a case where a light source unit 26 including four laser diodes is used, the dot pattern DP has four or more dots lined up at regular intervals in the main scanning direction, at different positions from each other in the sub scanning direction so as to be displaced in units of pixels from each other.

The present disclosure is applicable not only to tandem-type color printers as shown in FIG. 1, but also to various image forming apparatuses that use a multi-beam optical scanning device 5, such as color copiers and color MFPs.

The present disclosure finds application in image forming apparatuses using a multi-beam optical scanning device. Based on the present disclosure, it is possible to provide an image forming apparatus that can by a simple method suppress changes in the density of a reference image due to beam pitch deviation during light amount calibration.

What is claimed is:

1. An image forming apparatus comprising:

an image forming section including:

an image carrying member having a photosensitive layer formed on a surface thereof;

a charging device that electrostatically charges the surface of the image carrying member; and a developing device having a developer carrying member that carries developer containing toner, the developing device developing an electrostatic latent image formed on the image carrying member into a toner image, the image forming section performing image formation by using the toner;

an optical scanning device having a plurality of light sources, the optical scanning device scanning the surface of the image carrying member electrostatically charged by the charging device with light emitted from the light sources to form the electrostatic latent image with reduced electrostatic charge;

an image density sensor that detects a density of the toner image formed in the image forming section; and a control unit that controls the image forming section and the optical scanning device, the control unit detects the density of a reference image for image density correction formed in the image forming section with the image density sensor and, based on the result of the detection, the control unit being operable to perform image density correction including bias calibration in which the control unit adjusts a developing voltage applied to the developer carrying member and thereby adjusts a density of a solid image and light amount calibration in which the control unit adjusts an exposure amount of the optical scanning device and thereby adjusts a density of a halftone image, wherein the reference image used for the light amount calibration has a dot pattern in which individual dots of which a number is larger than a number of light sources are arrayed at regular intervals in a main scanning direction, which is a scanning direction of the optical scanning device, the dot pattern being formed repeatedly in the main scanning direction and in a sub scanning direction, which is orthogonal to the main scanning direction, of the dots forming the dot pattern, all dots arrayed at a predetermined interval from each other in the main scanning direction are arranged at different positions from each other in the sub scanning direction so as to be displaced in units of pixels from each other, and in the dot pattern, an area ratio between parts with low and high image densities is constant.

2. The image forming apparatus according to claim 1, wherein an amount of displacement of each of the dots in the sub scanning direction is determined such that the dots of which the image density changes when the scanning positions of the light emitted from the plurality of light sources are displaced are, in the dot pattern, evenly distributed in the main scanning direction.

* * * * *